(12) United States Patent
Cable

(10) Patent No.: US 7,235,306 B2
(45) Date of Patent: Jun. 26, 2007

(54) FLAVOR BARRIER

(75) Inventor: Kevin Cable, Waynesville, NC (US)

(73) Assignee: BRPP, LLC, Canton, NC (US)

( * ) Notice: Subject to any disclaimer, the term of this patent is extended or adjusted under 35 U.S.C. 154(b) by 0 days.

(21) Appl. No.: 10/718,906

(22) Filed: Nov. 21, 2003

(65) Prior Publication Data

US 2004/0105942 A1 Jun. 3, 2004

Related U.S. Application Data

(60) Provisional application No. 60/428,293, filed on Nov. 22, 2002.

(51) Int. Cl.
B32B 23/06 (2006.01)
B23B 27/08 (2006.01)

(52) U.S. Cl. .................... 428/511; 428/34.2; 428/36.7; 428/35.6; 428/349; 428/512; 426/388; 426/590; 426/616

(58) Field of Classification Search ........... 156/244.11; 428/511, 512, 34.2, 36.7, 35.6, 349; 426/388, 426/590, 616
See application file for complete search history.

(56) References Cited

U.S. PATENT DOCUMENTS

| | | | |
|---|---|---|---|
| 4,977,004 A * | 12/1990 | Bettle et al. ............... | 428/36.7 |
| 5,324,528 A | 6/1994 | Wright et al. | |
| 5,616,353 A | 4/1997 | Wright et al. | |
| 5,693,414 A * | 12/1997 | Peiffer et al. ............... | 428/327 |
| 6,110,548 A | 8/2000 | Kinsey | |
| 6,113,719 A | 9/2000 | Parks et al. | |
| 6,333,087 B1 | 12/2001 | Jerdee et al. | |
| 6,372,317 B1 * | 4/2002 | Denney et al. ............. | 428/34.2 |
| 6,482,484 B1 * | 11/2002 | Brown et al. ............... | 428/35.8 |
| 6,887,538 B2 * | 5/2005 | Denney et al. ............. | 428/34.2 |
| 6,919,111 B2 * | 7/2005 | Swoboda et al. .......... | 428/34.2 |
| 2001/0055692 A1 * | 12/2001 | Heffelfinger et al. ....... | 428/516 |
| 2002/0051873 A1 * | 5/2002 | Castle et al. ................ | 428/215 |
| 2002/0187333 A1 * | 12/2002 | Gu .......................... | 428/308.8 |
| 2003/0186069 A1 * | 10/2003 | Denney et al. .......... | 428/479.3 |
| 2004/0105942 A1 * | 6/2004 | Cable ........................ | 428/34.2 |
| 2004/0224172 A1 * | 11/2004 | Cable et al. ............. | 428/476.9 |
| 2005/0037162 A1 * | 2/2005 | Adams ....................... | 428/34.2 |
| 2005/0147803 A1 * | 7/2005 | Denney et al. ............. | 428/219 |

FOREIGN PATENT DOCUMENTS

| | | |
|---|---|---|
| JP | 2002308347 | 10/2002 |
| WO | WO 99/52972 | 10/1999 |
| WO | WO 00/76862 | 12/2000 |

OTHER PUBLICATIONS

Sajilata et al. "Scalping of Flavors in Packaged Foods" Institute of Food Technology, vol. 6, 2007.*
XP-002426970, Database WPI Week 200324, Derwent Publications, Ltd., London, GB: AN 2003-242789 JP 2002 308347 A *abstract*.

* cited by examiner

*Primary Examiner*—D. Lawrence Tarazano
(74) *Attorney, Agent, or Firm*—J. Bennett Mullinax, LLC

(57) ABSTRACT

A heat sealable barrier layer for food and beverage cartons is provided, the barrier layer including an additive material which reduces the amount of essential oil scalping from citrus products. Additionally, a carton coating layer and process is provided for reducing a coefficient of friction of stacked carton blanks. An additional embodiment of the invention provides for a paperboard substrate having reduced water vapor transmission rates, the reduction in water vapor transmission rates being attributed to one or multiple extruded layers containing an effective amount of an inorganic additive.

9 Claims, 1 Drawing Sheet

FLAVOR BARRIER

RELATED APPLICATIONS

This application claims the benefit of U.S. Application Ser. No. 60/428,293 filed on Nov. 22, 2002, and which is incorporated herein by reference.

FIELD OF THE INVENTION

This invention is directed toward a paperboard container suitable for juice and similar beverages.

BACKGROUND OF THE INVENTION

This present invention relates to a barrier structure for food packages which enables an extended product shelf life. With respect to juice containers, there exists a variety of performance considerations with respect to packaging the juice in order to provide a cost-effective container which meets the needs of multiple performance characteristics. For citrus beverages such as orange juice, it is desirable to provide a barrier layer to paperboard cartons which minimizes the scalping of D-limonene and other citrus associated essential oils. The presence of the essential oils within a juice product are important to the taste and perceived quality of the juice.

As set forth in U.S. Pat. No. 5,616,353, which is incorporated herein by reference, D-limonene often migrates into and is absorbed by the polyethylene coating of a carton. As much as 30% of the D-limonene in a juice product may be absorbed into the heat seal coating layer within just a few days. For certain barrier coatings, as much as a 60% loss of d-limonene can occur prior to the expiration of the container's shelf life. As the D-limonene and other essential oils are scalped by migration into the paperboard container's heat seal coating layer, the loss of essential oils can bring about an alteration in the taste of the juice product.

Additionally, loss of D-limonene, the most prevalent essential oil in citrus juice, has also been associated with an increase in microbial growth and the attendant loss of nutritional value due to the oxidation of Vitamin C (ascorbic acid).

Various laminate paperboard structures are known in the art to combat the problem of scalping. Some such structures are discussed in U.S. Pat. No. 4,977,004 which discloses using a layer of EVOH to reduce the loss of flavor components.

U.S. Pat. No. 6,110,548 discloses the use of thin layers of LDPE in conjunction with a high barrier EVOH inner layer to reduce flavor scalping.

U.S. Pat. No. 4,977,004, incorporated herein by reference, discloses a barrier liner for food packages comprising twin layers of EVOH. One layer is interposed between two moisture barriers such as high density polyethylene (HDPE), EVOH-compatible adhesives, or low density polyethylene (LDPE). The innermost layer of EVOH provides a barrier against loss of flavor components.

While there are a variety of barrier laminates directed to preventing loss of flavoring components, there remains room for variation and improvement within the art.

SUMMARY OF THE INVENTION

The present invention provides a barrier structure suitable for converting into food and beverage packages. The barrier structure affords good heat sealing properties and reduces the amount of scalping of D-limonene and other essential oils.

In at least one embodiment of the present invention, the barrier structure comprises a food contact layer, or skin coat, of a polyolefin polymer such as LDPE or MDPE. An additive is mixed with the skin coat prior to extruding the skin coat layer onto the laminate structure. As a result, the total amount of polymer present on the skin layer is reduced, thereby decreasing the amount of scalping. The incorporation of an inorganic additive into the polyolefin has been found to not impair the sealing performance of other useful properties of the skin layer.

It is yet another aspect of at least one of the present embodiments to provide a barrier laminate structure having an interior D-limonene essential oil barrier layer comprising a polyolefin and an inorganic additive selected from the group consisting of calcium carbonate, diatomaceous earth, silicate anti-blocks, and combinations thereof.

It is yet another aspect of at least one of the present embodiments to provide a laminated board structure having an interior skin or seal layer to which a friction reducing amount of an inorganic additive has been added. As used herein, the term "friction reducing" is defined as an amount of additive which brings about a reduction in the coefficient of friction of the laminated board structures. By incorporating an additive into the polyolefin layer, the coefficient of friction is lessened and facilitates an easier carton feed using mechanized packing equipment. The ability to lower the coefficient of friction of the skin layer enables the use of a linear low density polyolefin (LLDPE) as the outer gloss or inner skin layer which would otherwise not be feasible. Lower density polyolefins, such as LLDPE, exhibit a wider heat seal temperature window that facilitates commercial juice packaging operations.

It is yet another aspect of at least one of the present embodiments to provide a laminated board structure having an interior seal layer in which an effective amount of an inorganic additive has been added. As used herein, the term "effective amount" is defined as an amount of additive that achieves a reduction in the scalping of essential oils while maintaining good heat sealing properties.

It is yet another aspect of at least one of the present embodiments to provide a container and a process of using the container which reduces scalping of essential oils into the container's interior polyolefin skin layer. The process comprises the steps of supplying a substrate selected from the group consisting of paper, paperboard, fiberboard, and bleached kraft paper having a first side and a second side opposite the first side; coating a product-contacting surface of the substrate with a layer of a polyolefin containing therein an effective amount of an inorganic additive such as calcium carbonate, diatomaceous earth, clay silicate, anti-blocks, and combinations thereof, and placing the juice product containing essential oils into an interior of the container, the juice product being in contact with the product contact surface of the substrate.

It is yet another aspect of at least one of the present embodiments to provide a laminated board structure having an interior D-limonene barrier layer to which an effective amount of an inorganic additive has been added. The barrier layer having the inorganic additive may be positioned adjacent a thin skin coat layer of LDPE.

It is yet another aspect of at least one of the present embodiments to provide a laminated board structure having improved water vapor transmission properties, the improved properties imparted by one or more water vapor barrier layers comprising an inorganic additive selected from the group consisting of calcium carbonate, diatomaceous earth, silicate, anti-blocks, and combinations thereof incorporated into an extruded polymer layer, the polymer layer selected from the group consisting of ethylene vinyl alcohol co-polymer, polyvinyl alcohol polymers, a polyethylene terephthalate, a polybutyene terephthalate, an acid-modified polyethylene terephthalate, a binylidene chloride co-polymer, a polyvinyl chloride polymer a vinyl chloride co-polymer, a polyamide polymer, a polyamide co-polymer, or a combination of these materials.

It is yet a further aspect of at least one of the present embodiments of the invention to provide a laminated barrier board structure having improved water transmission properties in which one or more of the adhesive tie layers have incorporated therein an inorganic additive in an amount sufficient to reduce the rate of water transmission through the tie layer while maintaining the desired adhesive qualities of the tie layer. Any of the conventional adhesive tie layers may be modified by the inclusion of an inorganic additive. Suitable adhesive tie layers include Plexars® (Quantum Chemical Company), CXA® (DuPont), Admer's® (Mitsui), and other conventional adhesive tie layers.

It is yet another aspect of at least one of the present embodiments of the invention to provide a laminated board structure having a plurality of laminate or film barrier layers, multiple layers of the plurality of barrier layers further comprising an inorganic additive, the inorganic additive providing, in each of the multiple barrier layers, a reduced rate of water transmission through the respective barrier layer.

It is yet another aspect of at least one of the present embodiments to provide a gable top carton having improved water transmission properties, said water transmission property improvements imparted by the inclusion of an inorganic additive within one or more polymer layers of the gable top carton.

These and other features, aspects, and advantages of the present invention will become better understood with reference to the following description and appended claims.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings.

DESCRIPTION OF THE PREFERRED EMBODIMENT

Reference now will be made in detail to the embodiments of the invention, one or more examples of which are set forth below. Each example is provided by way of explanation of the invention, not a limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

As used herein, the terms "inner" and "outer" are used to describe and clarify relative positions of various laminate layers. The term "inner" refers to a position layer along the carton interior. Similarly, "outer" is used to indicate a layer or surface closest to the gloss or exterior surface of the laminate/carton. The term "skin coat" refers to the food product contact layer which is the innermost layer of the laminate/carton and which provides the food or beverage contact surface.

The term "barrier layer" may refer to a single layer or more commonly a composite of multiple differing layers of extruded materials and which imparts a barrier property to the resulting structure. Such barrier layers may have various constituents to serve multiple roles such as barriers for liquids, water vapor, oxygen, essential oils, or other gaseous or liquid constituents for which passage through the structure is lessened or controlled.

The term "D-limonene barrier layer" refers to at least a single layer of extruded material containing therein an inorganic or organic additive which serves to limit the amount of D-limonene and other essential oils which either migrate into or are absorbed by the extruded material.

The term "effective amount" is defined as the amount of an inorganic or organic additive added to a barrier layer that achieves a reduction in the scalping of essential oils.

Figure 1:
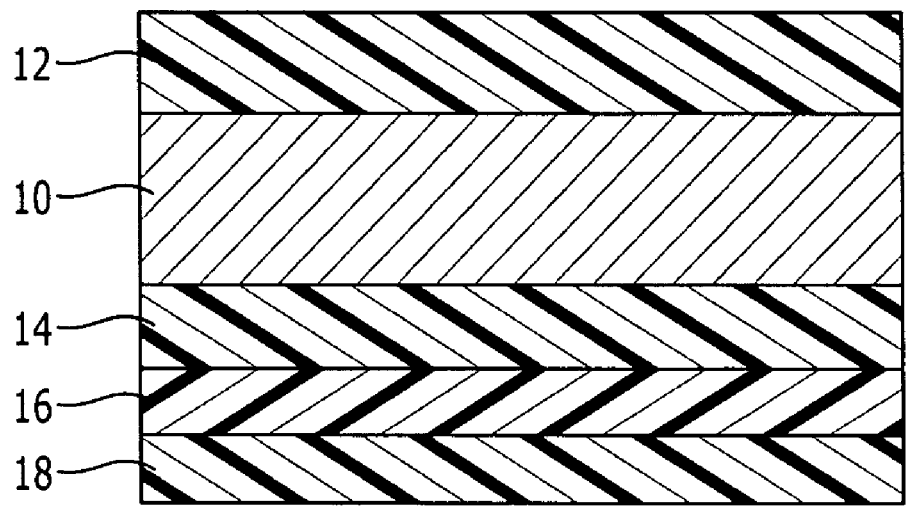
FIG. 1 is a cross section setting forth a laminate board structure according to one preferred embodiment of the present invention.

A variety of laminated carton structures are known in the art which employ a skin coat of a polyolefin. It is believed that the use of the additive material described herein can be used to advantage with many such conventional citrus juice board structures. FIG. 1 sets forth one laminated structure according to the teachings of commonly assigned PCT application having serial number PCT/US00/43234 filed on Nov. 29, 2000, and which is incorporated herein by reference. The laminated structures taught therein may be modified by incorporating an additive into the skin coat layer 18 as taught herein. Additionally, additive material may be used in two or more of the extruded layers, including adhesive tie layers so as to bring about the additional improvements in water vapor transmission rates as discussed below.

As seen in FIG. 1, the paperboard fiber layer 10 is sandwiched between an extruded MDPE layer 12, forming an exterior gloss surface, and an extruded inner polyamide layer 14. The polyamide layer 14 is attached directly to the inner surface of board 10. An adhesive tie layer 16 joins the inner surface of the polyamide layer 14 to the adjacent skin layer 18 of MDPE. Tie layer 16 may be provided by a variety of materials well known in the art, such as modified polyethylene resins, examples of which include Bynel E388™ (Dow Chemical) or Plexar (Equistar) 175™. Either MDPE layer 12 or layer 18 may be substituted with LDPE if desired.

As described in Applicant's commonly assigned co-pending application referenced above, the MDPE skin layer exhibits less absorption of essential citrus oils such as D-limonene when compared to lower density polyethylene skin layers. However, in accordance with this invention it has been found that even further improvements in essential oil absorption and migration can be obtained by incorporating additives into the skin layer 18 or at least a portion of the heat sealable interior layer(s). Additionally, improvements in essential oil absorption and migration properties of LDPE and other heat sealable polyethylenes can be obtained by incorporating an additive into a least one of the interior heat seal layer(s).

EXAMPLE 1

To illustrate the properties of the polyolefin skin layer having an inorganic additive, a comparative study of an extruded LDPE layer was compared to an extruded LDPE layer which incorporated a 35% by weight of calcium carbonate.

A layer of LDPE (Chevron® 4517) having a density of 0.923 gm/cm$^2$ and a 5 melt index additionally contained a loading of 35% by weight of calcium carbonate (particle size 1.4 micron) and was extruded only a Mylar® film. A control sample of LDPE having no calcium carbonate was also coated onto a separate piece of Mylar® film. The thickness of the control and experimentally coated LDPE layers was 11.4 mm.

The respective coated Mylar® film was cut into 2 inch by 6 inch strips and the corresponding LDPE extrusion coating was peeled from the Mylar® film surface. Each LDPE strip was weighed and then fully exposed to a 97% laboratory grade D-limonene in a sealed jar at room temperature. The immersed strips were exposed for a period of 31 days at which time the strips were removed from the D-limonene and weighed. The control LDPE strip absorbed 6.7% by weight D-limonene. In comparison, the LDPE strip containing calcium carbonate absorbed only 3.7% by weight D-limonene.

In addition, representative samples of the extruded LDPE with calcium carbonate were also immersed in orange juice at 38° F. over a three week interval. No adverse reactions between the juice and the LDPE/calcium carbonate were noted. As indicated by the results above, an LDPE layer having the calcium carbonate additive absorbed approximately 50% less D-limonene than the control LDPE layer over the same time interval.

An additional benefit of incorporating the inorganic additive into the skin coat is that the unfolded container blanks exhibit a lower coefficient of friction which is attributable to the inclusion of the additive material. The lower coefficient of friction was established by taking strips of LDPE film including control films and films having a 35% weight loading of the inorganic additives. These strips were evaluated on a coefficient of friction sled in which a force transducer is used to measure the coefficient of friction. The results indicate that the inclusion of the inorganic additive lowers the coefficient of friction in the polyethylene films.

As a result, cartons having the additive present on an innermost skin layer surface are more easily handled by the standard packaging machinery. Furthermore, the inclusion of an additive into the polyolefin skin coat may permit the use of linear low density polyolefins (LLDPE) and metallocene catalyzed LLDPE which were heretofore difficult to use given the relatively higher coefficient of friction. The lower density polyolefins exhibit wide heat seal temperature windows which provide additional advantages in the heat sealing of the paperboard edges during commercial carton assembly and sealing. As a result, there can be greater variability in the heat seal temperatures used by the packaging equipment. Specifically, the use of lower density polyolefin/inorganic additive as a skin coat layer allows a lower sealing temperature to be used. It is believed that exposure of the carton board to lower heat seal temperatures helps to maintain the integrity of additional barrier layers which may be present in the laminated board structure.

The incorporation of the calcium carbonate has also been shown to maintain the desired heat seal properties of the skin coat layer. The heat sealing properties of the various skin layers evaluated herein were performed by coating a conventional juice paperboard on one side with either a modified (additive) skin layer or a control (no additive) skin layer. The coated paperboard was then folded and heat sealed using conventional temperatures and pressure and evaluated for the strength and integrity of the heat sealed edges.

While the preferred embodiment is made in reference to an extruded polyolefin layer having about a 20% weight by loading of calcium carbonate, it is recognized that other forms of barrier layers, inorganic additives, and relative percents of inorganic additives within a barrier layer(s) may be utilized. By way of example, film layers having inorganic additives present within the film may be applied to the board structure to form the skin layer of an assembled container. The use of film layer coatings onto board and similar laminated substrates is well known within the art. Such film-forming layers having calcium carbonate or other additives would provide a structure having properties similar to the exemplary embodiments set forth above.

With respect to the inorganic additives, it is believed that any inorganic material having a sufficient particle size and dimensions which facilitates the formation of blended films and/or extrusion layers will offer the advantages of reducing scalping by the associated polyolefin. As such, any additive which does not scalp essential oils and which is approved for inclusion in a food/beverage skin contacting layer is believed to suffice. The inclusion of an additive effectively reduces the amount of polyolefin material in the skin layer. It is through the reduction of the amount of polyolefin material that at least part of the reduction in scalping is achieved. Additionally, it is also possible that the additive material may impeded or reduce the rate of absorption by the polyolefin of the D-limonene or other essential oils. To the extent the additive material reduces the rate of essential oil uptake, then the additive material itself imparts some degree of anti-scalping properties to the laminated structure.

While the inorganic additives disclosed herein are in the form of small particulates, it is noted that variations in the shape of the additive, such variations including platelets or similar aspect ratios, may offer additional improvements with respect to barrier properties for essential oils as well as water vapor transmission characteristics.

Further, the present invention is not limited to the described inorganic additives. It is believed that any particulate material meeting FDA approval and which is incorporated into the skin coat layer will bring about the useful attributes noted above. As such, fine particulates of various organic materials could be used. It is, of course, recognized that any such additive material must maintain its particulate properties when exposed to the extrusion, heat sealing, and filling temperatures as commonly employed in the juice packaging industry. Through routine experimentation using the techniques set forth above, one having ordinary skill in the art could evaluate any organic or inorganic particulate additive for suitability based upon an absorption analysis of D-limonene or other essential oil, combined with the ability of the skin coat layer to provide adequate heat sealing properties used in carton or container construction.

Additionally, skin coat layers containing immiscible blends in which a polymer or other constituent is present in a dispersal phase may also be used as a skin coat layer. Such immiscible additives operate as a phase separation domain in which the size of the domain is used to operate as an additive. With respect to LDPE and other polyethylene layers, an appropriate blend of EVOH may serve as an immiscible polymer that, in combination with the polyethylene skin coat layer, serves to reduce the scalping of D-limonene and other essential oils. In the example of EVOH, EVOH is a polar polymer which tends to separate from the polyethylene backbone molecule. As a result of the separation, proper proportions of EVOH within the polyethylene skin coat layer can provide discrete domains of EVOH within the skin coat layer. The discrete EVOH domains operate as an additive and thereby reduced the amount of D-limonene uptake by the skin coat layer. Further, it is recognized that the skin coat layers discussed herein are in reference to extruded layers. Comparable results may be achieved by using heat sealable films containing therein appropriate amounts of the various types of additives. The use of discrete film layers to provide a laminated board structure suitable for use as a citrus beverage container are well known in the art. It is further contemplated that mixtures of organic additives, inorganic additives, and immiscible additives may all be used in various combinations so as to achieve a desirable skin coat layer.

In a similar manner, the suitability of a skin coat layer may be evaluated using the techniques referenced above. It is believed that any FDA approved skin layer constituents(s) which may be prone to scalping of essential oils can be modified by the inclusion of one or more additives described herein and thereby achieve an improved skin coat layer.

Figure 2:
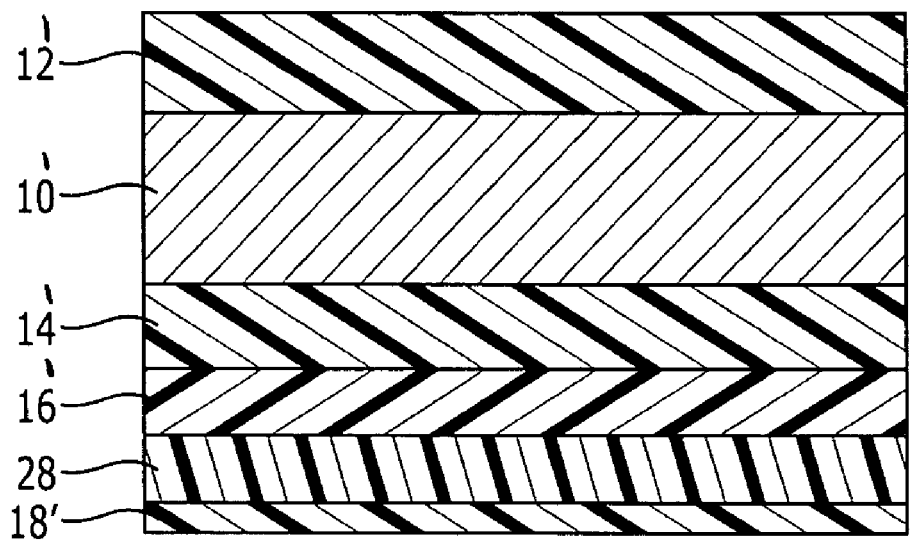
FIG. 2 is a cross section setting forth a laminate board structure according to a second preferred embodiment of the present invention.

An additional embodiment of the present invention may be seen in reference to FIG. 2. FIG. 2 provides for a paperboard fiber layer 10' sandwiched between an extruded LDPE layer 12', forming an exterior gloss surface and an extruded inner polyamide layer 14'. The polyamide layer 14' is attached directly to the inner surface of board 10'. An adhesive tie layer 16' joins the inner surface of the polyamide layer 14' to an adjacent scalping resistant layer 28. The scalping resistant barrier layer 28 may comprise a polyethylene such as MDPE or LDPE and contains therein an effective amount of an inorganic additive such as calcium carbonate. Adjacent the scalping barrier layer 28, is an outermost skin layer 18'. Skin layer 18' comprises any heat sealable polyethylene and which may include MDPE or LDPE. In one preferred embodiment, the scalp resistant essential oil barrier layer 28 may comprise a 5 pound coating weight of LDPE having about 20% by weight of calcium carbonate. The adjacent skin layer 18' may comprise a 5 pound coating weight of LDPE. The carton similar to that seen in FIG. 2 may also be provided by a laminated board structure having the following construction in which the additive-containing barrier layer is sandwiched between two layers of a heat sealable LDPE:

16# LDPE/board/5# nylon/5# tie/15# LDPE/5# LDPE with 20% weight CaCO$_3$/5# LDPE An additional laminated board construction may be provided according to the following construction:

16# LDPE/board/5# nylon/5# tie/20# LDPE with 20% weight CaCO$_3$/5# LDPE

As seen in the laminated board examples set forth above, the essential oil barrier layer(s) may be covered by an inner thin skin coat layer of LDPE. The thin skin coat LDPE layer will result in the uptake of D-limonene into the skin layer. However, the skin layer in the examples set forth above is much thinner than typical skin layers and therefore will have less ability to absorb D-limonene than will a thicker skin coat layer. The presence of a heat sealable barrier layer containing an additive such as calcium carbonate and the adjacent heat sealable layer(s) provides the overall thickness needed for an effective heat sealing of a resulting carton. In addition, the calcium carbonate or other additive serves to limit the amount and/or rate of D-limonene uptake into the additive-containing layer. In this manner, the overall amount of D-limonene can be reduced while at the same time providing an outermost skin coat layer containing no additive. Such a construction minimizes any processing concerns or juice exposure concerns attributable to the outermost skin layer having the additive material therein. In essence, the D-limonene barrier layer is subsequently buried beneath a thin layer of a heat sealing polyethylene which is compatible with the adjacent D-limonene barrier layer.

The use of a thin, additive free, skin coat layer adjacent the additive containing D-limonene barrier layer may offer advantages in preventing possible adverse reactions between the additive material and the food contents of a resulting carton. In the examples set forth above, the barrier free skin coat layer provides a protective layer which prevents direct contact between the carton contents and the additive containing barrier layer. In this manner, it is envisioned that additive materials may be used which cannot be brought into intimate direct contact with the contents of a carton. In addition, to the extent additive materials are identified which lessen the heat sealability of the barrier layer, the outermost barrier free skin layer will enhance the heat sealability. However, with respect to orange juice and other citrus products, evaluation of skin coat layers containing about 20% to about 35% calcium carbonate as an essential oil barrier yielded no adverse reactions when placed in contact with orange juice. With respect to other additive materials which may be used in accordance with this invention or with different container contents, the use of a thin, additive-free skin coat layer may be advisable.

It has also be found that the water vapor transmission rate (WVTR) of barrier board structure may be improved by the inclusion of an inorganic additive such as calcium carbonate in one or more of the extruded layers forming the barrier structure. In accordance with this invention, it has been found that the inclusion of a 20% by weight of calcium carbonate in a 20 pound layer extruded LDPE can achieve a 7% reduction in the WVTR through the resulting barrier structure.

Additionally, it is believed that further improvements in WVTR values may be achieved by the inclusion of calcium carbonate and other similar additives in multiple layers which define the barrier structure. For instance, each extruded layer of the barrier structure seen in FIG. 1 or FIG. 2 may have included therein an effective water vapor transmission reducing amount of an additive such as calcium carbonate. Specifically, the outer gloss layer, nylon layer, various tie layers, internal barrier layers, and the skin coat layer may all include an additive which helps reduce the WVTR of the resulting structure. The amount of additive which may be included in any one layer may be varied as needed so as to maintain the other desired functions of the respective layer. For instance, the amount of additive added to a tie layer may be adjusted so as to maintain the desired adhesion functionality of the tie layer. Likewise, the amount of calcium carbonate which may be included in a nylon layer may be adjusted so as to maintain good board adhesion and other barrier or abuse properties of the nylon layer.

Collectively, a barrier structure may be provided in which about 20 to about 35% by weight of one or more of the extruded layers may comprise an inorganic additive. The collective arrangement of multiple inorganic additive layers are believed to offer a significant reduction in the WVTR of the resulting structure. While not wishing to be limited by theory, it is believed that the multiple layers of calcium carbonate each contribute to a reduction in the WVTR value of the structure. Collectively, the multiple layers of calcium carbonate containing polymers provide a more torturous pathway for water vapor flow as the additive particles block the linear passage of water vapor. The resulting structure thereby avoids problems associated with high WVTR values.

While an inorganic additive of about 20% to about 35% by weight has been found useful with respect to the examples set forth herein, it is believed that variations of this amount may also be useful to accomplish the objectives of water vapor transmission and anti-scalping properties identified herein. One having ordinary skill in the art may use routine experimentation to determine effective loading levels of various additives so as to achieve the desired reduction in water vapor transmission rates or anti-scalping barrier properties. For instance, with respect to achieving low WVTR values to a paperboard structure, multiple film or laminated layers may be used which have less than 20% by weight of an additive. However, the cumulative effect of multiple layers having a smaller relative amount of an additive may achieve a desired water vapor transmission rate equivalent to or better than a higher loading level present within a single laminate layer or film barrier layer.

Reducing the WVTR values provides several advantages to the resulting carton. For certain products such as fabric softeners, the desired shelf life may extend beyond one year. Barrier structures which achieve low WVTR values can contribute to the prolonged shelf life of products such as fabric softeners which tend to lose weight via water loss during storage. By reducing water loss, the stated product weight can be maintained for a longer time period and results in loss product loss and fewer product returns.

Additionally, reducing the WVTR within a barrier structure can improve properties of certain moisture sensitive oxygen barriers such as EVOH. While EVOH is an excellent oxygen barrier, the barrier properties of EVOH are rapidly degraded in the presence of high humidity. By reducing the WVTR through a barrier structure containing EVOH, the desired oxygen barrier properties can be maintained.

Further, a lower WVTR value will also maintain the desired stiffness and rigidity of the paperboard component of a barrier carton. The paperboard component, when subjected to excess moisture, loses some of its structural integrity and contributes to an undesired carton bulge. The carton bulge is perceived by consumers as an undesirable trait which, in the minds of consumers, is frequently associated with a less than fresh product. Accordingly, maintaining low WVTR values contributes to an overall barrier structure which is more resistant to carton bulge.

While the above structures and discussion are directed to extruded polymer layers containing an additive such as calcium carbonate, it is readily appreciated that similar results may be obtained using polymer films having therein the desired amount of an inorganic additive. The use and application of films as opposed to extruded layers, is well known within the art.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of the various embodiments may be interchanged, both in whole or in part. Therefore, the spirit and scope of the appended claims should not be limited to the description of the preferred versions contained therein.

That which is claimed is:

1. A barrier laminate comprising:
   a paperboard substrate having a first surface and a second surface, the second surface being opposite the first surface, said second surface being adjacent a plurality of extruded polymer layers;
   a first layer selected from one of said plurality of extruded polymer layers and further comprising a heat sealable layer of a polyolefin and containing between about 20% to about 35% of an essential oil scalping reducer comprising an inorganic additive;
   a second layer selected from one of said plurality of extruded polymer layers and comprising a first water vapor barrier layer and having an effective amount of a water vapor transmission rate reducing inorganic additive; and,
   a third layer selected from one of said plurality of extruded polymer layers, and comprising a second water vapor barrier layer comprising an effective water vapor transmission rate reducing amount of an inorganic additive.

2. The barrier laminate according to claim 1 wherein a fourth layer selected from one of said plurality of extruded polymer layers further comprises a third water vapor barrier layer comprising an effective water vapor transmission rate reducing amount of an inorganic additive.

3. The barrier laminate according to claim 1 wherein at least one of said first water vapor barrier layers and said second water vapor barrier layers is an adhesive tie layer.

4. The barrier laminate according to claim 1 wherein said inorganic additive is calcium carbonate.

5. The barrier laminate according to claim 2 wherein said inorganic additive is calcium carbonate.

6. The barrier laminate according to claim 3 wherein said inorganic additive is calcium carbonate.

7. A carton filled with a juice beverage constructed according to a barrier laminate comprising:
   a paperboard substrate having a first surface and a second surface, the second surface being opposite the first surface;
   a first barrier layer extrusion coated as an outermost layer along said first surface, said barrier layer further comprising between about 20% to about 35% by weight of an essential oil anti-scalping additive;
   a second barrier layer comprising an extruded polymer layer having an effective amount of a water vapor transmission rate reducing inorganic additive, said first water vapor barrier layer positioned between said paperboard substrate and said first barrier layer; and,
   a third barrier layer positioned between said paperboard substrate and said second barrier layer, said third barrier layer comprising an effective water vapor transmission rate reducing amount of an inorganic additive.

8. The carton according to claim 7 wherein said essential oil anti-scalping additive is calcium carbonate.

9. The carton according to claim 7 wherein said inorganic additive in at least one of said second and said third barrier layers is calcium carbonate.

* * * * *